(12) United States Patent
Anderson (10) Patent No.: US 11,979,964 B2
(45) Date of Patent: *May 7, 2024

(54) METHOD AND APPARATUS FOR TEMPERATURE CHARACTERIZATION IN WELDING

(71) Applicant: Illinois Tool Works Inc., Glenview, IL (US)

(72) Inventor: Dylan Anderson, Princeton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 780 days.

This patent is subject to a terminal disclaimer.

(21) Appl. No.: 16/995,018

(22) Filed: Aug. 17, 2020

(65) Prior Publication Data

US 2021/0059023 A1 Feb. 25, 2021

Related U.S. Application Data

(60) Provisional application No. 62/890,181, filed on Aug. 22, 2019.

(51) Int. Cl.
*H05B 6/08* (2006.01)
*B23K 13/08* (2006.01)
*G05D 23/19* (2006.01)

(52) U.S. Cl.
CPC .............. *H05B 6/08* (2013.01); *B23K 13/08* (2013.01); *G05D 23/1917* (2013.01)

(58) Field of Classification Search
CPC . H05B 6/06; H05B 6/08; H05B 6/101; B23K 13/01; B23K 13/08

(Continued)

(56) References Cited

U.S. PATENT DOCUMENTS 6,713,737 B1 3/2004 Verhagen
8,038,931 B1 * 10/2011 Thomas ................. H05B 6/101
266/97

(Continued)

OTHER PUBLICATIONS

International Search Report and Written Opinion, dated Nov. 23, 2020, in International application No. PCT/US2020/047419, filed on Aug. 21, 2020 (13 pages).

(Continued)

*Primary Examiner* — Vy T Nguyen
(74) *Attorney, Agent, or Firm* — McAndrews, Held & Malloy, Ltd.

(57) ABSTRACT

Provided is a system for controlling heating of a workpiece that includes an interface to receive a target temperature ($T_T$) for the workpiece. A processor is configured to determine, based on monitoring outputs of temperature sensor(s), a current highest temperature ($T_H$) for the workpiece and set a control temperature ($T_C$) based on the received target temperature and the current highest temperature. A control system is configured to heat the workpiece to substantially the control temperature ($T_C$) by turning on a heating device, and turning off the heating device when the workpiece reaches substantially the control temperature ($T_C$). The processor is further configured to characterize a temperature ramp rate based on a measured temperature overshoot at the workpiece after turning off the heating device, and the control system is configured to heat the workpiece to the received target temperature ($T_T$) by controlling the heating device based on the temperature ramp rate.

20 Claims, 4 Drawing Sheets

(58) Field of Classification Search
USPC .... 219/632, 663, 667, 677; 266/129, 87, 96, 266/97, 98
See application file for complete search history.

(56) References Cited

U.S. PATENT DOCUMENTS

| | | |
|---|---|---|
| 2010/0282097 A1 | 11/2010 | Schulte |
| 2015/0334780 A1 | 11/2015 | Beistle |
| 2015/0334783 A1 | 11/2015 | Mlnarik |
| 2016/0101481 A1* | 4/2016 | Holverson ........... B23K 9/0953 219/121.72 |

OTHER PUBLICATIONS

International Preliminary Report on Patentability, dated Feb. 17, 2022, in International application No. PCT/US2020/047419, filed on Aug. 21, 2020 (8 pages).

* cited by examiner

METHOD AND APPARATUS FOR TEMPERATURE CHARACTERIZATION IN WELDING

RELATED APPLICATIONS

This patent claims priority to U.S. Provisional Patent Application Ser. No. 62/890,181, filed Aug. 22, 2019, entitled "Method and Apparatus for Temperature Characterization in Welding." The entirety of U.S. Provisional Patent Application Ser. No. 62/890,181 is incorporated herein by reference.

BACKGROUND

The present disclosure relates to heating a workpiece for welding, and more particularly, to a method and apparatus for temperature characterization for optimally heating a workpiece for welding.

Induction heating is a method for producing heat in a localized area on a susceptible metallic object. Induction heating involves applying an AC electric signal to a heating loop or coil placed near a specific location on or around the metallic object to be heated. The varying or alternating current in the loop creates a varying magnetic flux within the metal to be heated. Current is induced in the metal by the magnetic flux, thus heating it. Induction heating may be used for many different purposes including curing adhesives, hardening of metals, brazing, soldering, and other fabrication processes in which heat is a necessary or desirable agent.

Limitations and disadvantages of conventional systems for heating a workpiece for welding will become apparent to one of skill in the art, through comparison of such approaches with some aspects of the present method and system set forth in the remainder of this disclosure with reference to the drawings.

SUMMARY

Methods and systems are provided for temperature characterization in welding, substantially as illustrated by and described in connection with at least one of the figures, as set forth more completely in the claims.

BRIEF DESCRIPTION OF THE DRAWINGS

These and/or other aspects will become apparent and more readily appreciated from the following description of some various aspects of examples of the disclosure, taken in conjunction with the accompanying drawings.

The figures are not necessarily to scale. Where appropriate, similar or identical reference numbers are used to refer to similar or identical components.

DETAILED DESCRIPTION

Various examples of the disclosure improve heating of a workpiece (e.g., a workpiece to be welded, brazed, etc.) to a target temperature by improving the accuracy of the heated workpiece temperature. For example, when working with smaller workpieces, a workpiece may be easily overheated by conventional heating systems because of the lower thermal mass of such workpieces. In some cases, overheating can damage the workpiece and/or delay performance of the welding operation. Therefore, conventional methods to avoid overheating the workpiece involve an operator closely attending to heating of the workpiece for welding, which may lead to inefficient use of time. When the workpiece is not sufficiently heated (e.g., is heated to less than the target temperature to avoid overheating), extra time may be needed for the actual welding process since the workpiece now needs additional time to be heated to the required temperature. Insufficient heating may lead to greater chances of failed weld, and may result in rejection of a weld done according to a weld procedure specification (WPS).

Therefore, when using, for example, a thermostatically controlled induction heating system to bring a workpiece to a desired temperature, users must be vigilant to ensure that undesired overheating does not occur due to the improper placement or slow response of a temperature sensing device. Monitoring can be particularly important when a heating capacity of a heating device, such as, for example, an induction heating device, exceeds what is required to heat a given workpiece and results in very short heating times.

The situations described above can occur, for example, where users are heating a workpiece with a small thermal mass and/or while using a temperature sensing device that may be poorly thermally coupled to the workpiece (e.g., armored temperature sensing device, temperature sensing device not tightly placed against the workpiece, etc.). However, overheating and/or poor thermal coupling may occur with workpieces of any size.

In the disclosed examples, the user need not manually calculate and set power limits to reduce the temperature overshoot when heating a workpiece. By increasing the accuracy of heating the workpiece and reducing the overshoot of poorly thermally coupled temperature sensing devices, the user can better make use of temperature sensing devices such as, for example, armored temperature sensing devices in various situations, which can result in quicker setup for the user. Disclosed example systems and methods can also aid in reducing wear on heating tools by limiting potential temperature overshoot past safe tool operating limits.

Figure 1:
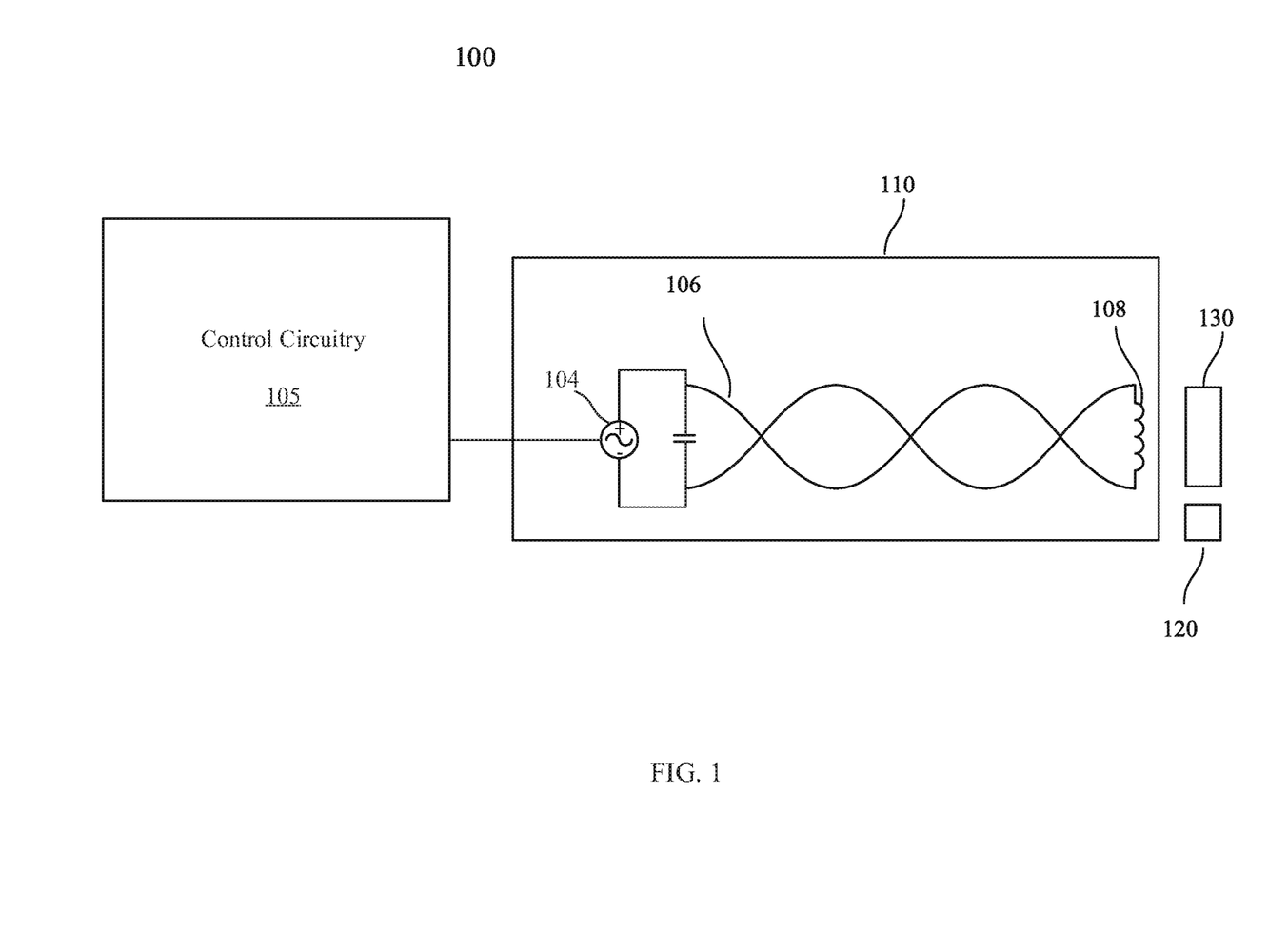
FIG. 1 is a high-level block diagram of an example heating system, in accordance with aspects of the disclosure.

FIG. 1 is a high-level block diagram of an example heating system, in accordance with aspects of the disclosure. Referring to FIG. 1, there is shown an example heating system 100 that comprises a control circuitry 105 configured to control a heating device 110 suitable for heating a workpiece 130, and sensors 120 suitable for monitoring a temperature of the workpiece 130. The heating system 100 may use any type of a heating system, and an example heating system may be an induction heating system.

Accordingly, the example heating device 110 is described in this disclosure for the heating system 100. The heating device 110 comprises induction heating power supply 104, conductors 106, and a heating coil 108. The heating system 100 is configured to provide power from the induction heating power supply 104 to the heating coil 108 via the conductors 106. The heating coil 108 is magnetically coupled to the workpiece 130 that is to be heated via the heating device 110. In operation, the induction heating power supply 104 outputs power to the heating device 110 at a heating frequency, which transfers the power to the workpiece 130 to inductively heat the workpiece 130. As illustrated in FIG. 1, the heating power supply 104 may be coupled to the heating device 110 via an extension cable 106.

The temperature of the workpiece 130 can be monitored at various locations by the sensors 120, which may comprise, for example, temperature sensors. The sensors 120 may be any type of sensors suitable for monitoring the temperature of a welding workpiece, such as, for example, armored temperature sensing devices or spot-welded sensing devices.

The control circuitry 105 is configured to monitor and control various functions. For example, the control circuitry 105 can monitor temperature information from the sensors 120 so that the heating device 110 can be controlled to appropriately control the temperature of the workpiece 130. The control circuitry 105 can also characterize, based on the received inputs from the sensors 120 and a user via a user interface (e.g., input devices 242 in FIG. 2), a temperature ramp rate for a workpiece so that it can be heated to the desired temperature without overheating the workpiece.

The control circuitry 105 comprises a hardware device capable of executing instructions to perform specific functions. Accordingly, the control circuitry 105 comprises any of a number of different types of processors, memory, logic circuitry, etc. for controlling the heating device 110.

An example heating coil 108 may include two or more conductors and a turn connector. The conductors (and, by extension, the heating coil 108) may be conformably wrapped around the workpiece 130 while the conductors are not electrically connected in series. The example heating coil 108 may comprise, for example, an induction heating blanket, an induction heating assembly, etc. The turn connector connects the two or more conductors in series to configure the first and second conductors as an inductor having two or more turns. The example heating coil 108 may include one or more electrical and/or thermal insulators to, for example, prevent short circuiting and/or protect the conductors from heat induced in the workpiece 130.

Figure 2:
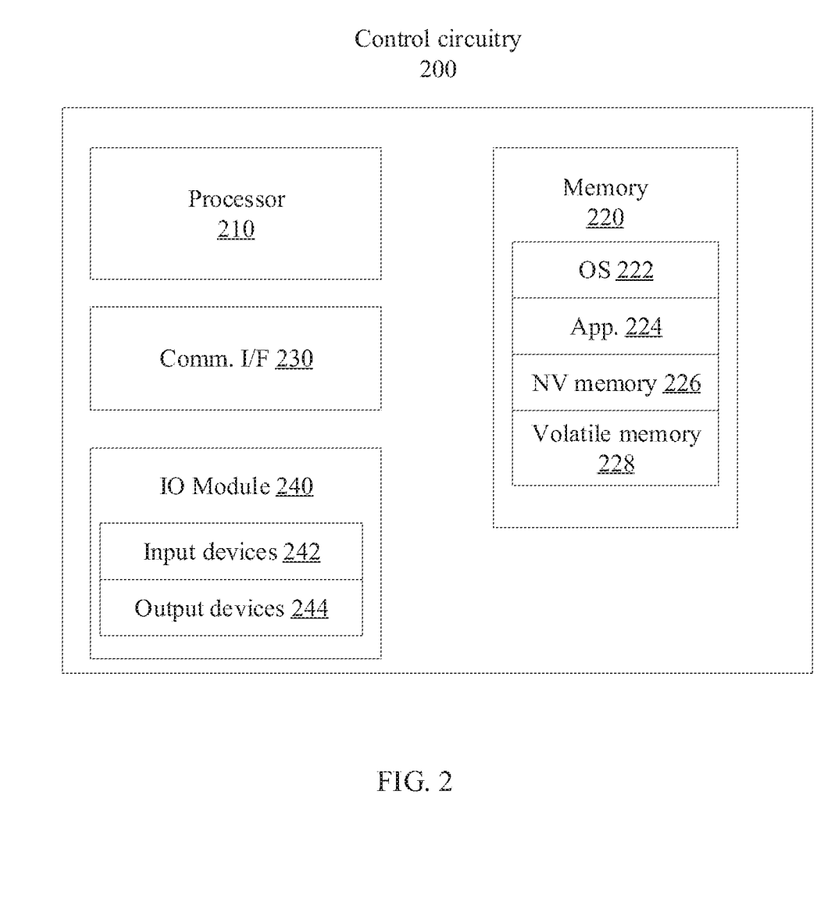
FIG. 2 shows a block diagram of an example control circuitry, in accordance with aspects of the disclosure.

FIG. 2 shows a block diagram of an example control circuitry, in accordance with aspects of the disclosure. Referring to FIG. 2, there is shown an example control circuitry 200 that may be used with various examples of the disclosure, and may be similar to the control circuitry 105 in FIG. 1. The control circuitry 200 may comprise, for example, a processor 210, memory 220, a communication interface 230, and an IO interface 240. The processor 210 may comprise, for example, one or more of processors (CPUs, GPUs, etc.), controllers, system on chips, ASICs, etc.

The memory 220 may include non-volatile memory 226 and volatile memory 228. The storage described for holding local data may be part of the memory 220 or comprise separate memory. The operating system 222 and applications 224 may be stored in, for example, the non-volatile memory 226, and may be copied to volatile memory 228 for execution by the processor 210. Various aspects of the disclosure may use different memory architectures that are design and/or implementation dependent. For example, some aspects of the disclosure may have the operating system 222 and applications 224 in the non-volatile memory 226 executed at least in part from the non-volatile memory 226.

The communication interface 230 may allow the control circuitry 200 to communicate with other devices via, for example, a wired protocol such as USB, Ethernet, Firewire, etc., or a wireless protocol such as Bluetooth, Near Field Communication (NFC), Wi-Fi, etc. The wired or wireless protocol may also be, for example, a proprietary protocol. The various types of radios for communication may be referred to as a transceiver for the sake of simplicity. The communication may be, for example, with various sensors and/or devices that can relay sensor data. The communication interface 230 may also be used to communicate with other networks such as local networks, cellular networks, etc. Additionally, the communication interface may allow various devices to plug into, for example, a USB ports. For example, a keyboard and/or a mouse may plug into their respective USB ports, or communicate wirelessly to a USB dongle that allows wireless communication with, for example, a wireless keyboard and/or mouse.

The control circuitry 200 may also comprise the IO module 240 for communication with a user via the input devices 242 and output information to be displayed on output devices 244. The input devices 242 may comprise, for example, switches, slide switches, membrane switches, buttons, touch sensitive screen, which may be a part of a display, a microphone, etc. The touch sensitive screen (touchscreen) may have soft buttons, switches, slide switches, keyboard, etc. that emulate their physical counterparts. The input devices 242 may also comprise, for example, a keyboard, a mouse, a trackball, etc., as well as various sensors, cameras, etc. The input devices 24 may additionally comprise, for example, bar code readers and/or other type of scanners that may be used to identify an object. The output devices 244 may comprise, for example, display(s), speaker(s), LED(s), vibration motor(s), etc. Some devices such as a touchscreen are able to provide both input and output functions of the IO module 240.

The processor 210 may operate using different architectures in different examples of the disclosure. For example, the processor 210 may use the memory 220 to store instructions to execute, or the processor 210 may have its own memory (not shown) for its instructions.

Various examples may use other architectures where the different functionalities may be grouped differently. For example, the functionalities may be in different integrated circuit chips, or different devices may be combined. For example, the IO module 240 and the communication interface 230 may be combined together. Additionally, the control circuitry 200 may refer logically to various physical devices. For example, one or more of the output devices 244 may be part of a different integrated circuit or on a different printed circuit board than one or more of the input devices 242.

Figure 3:
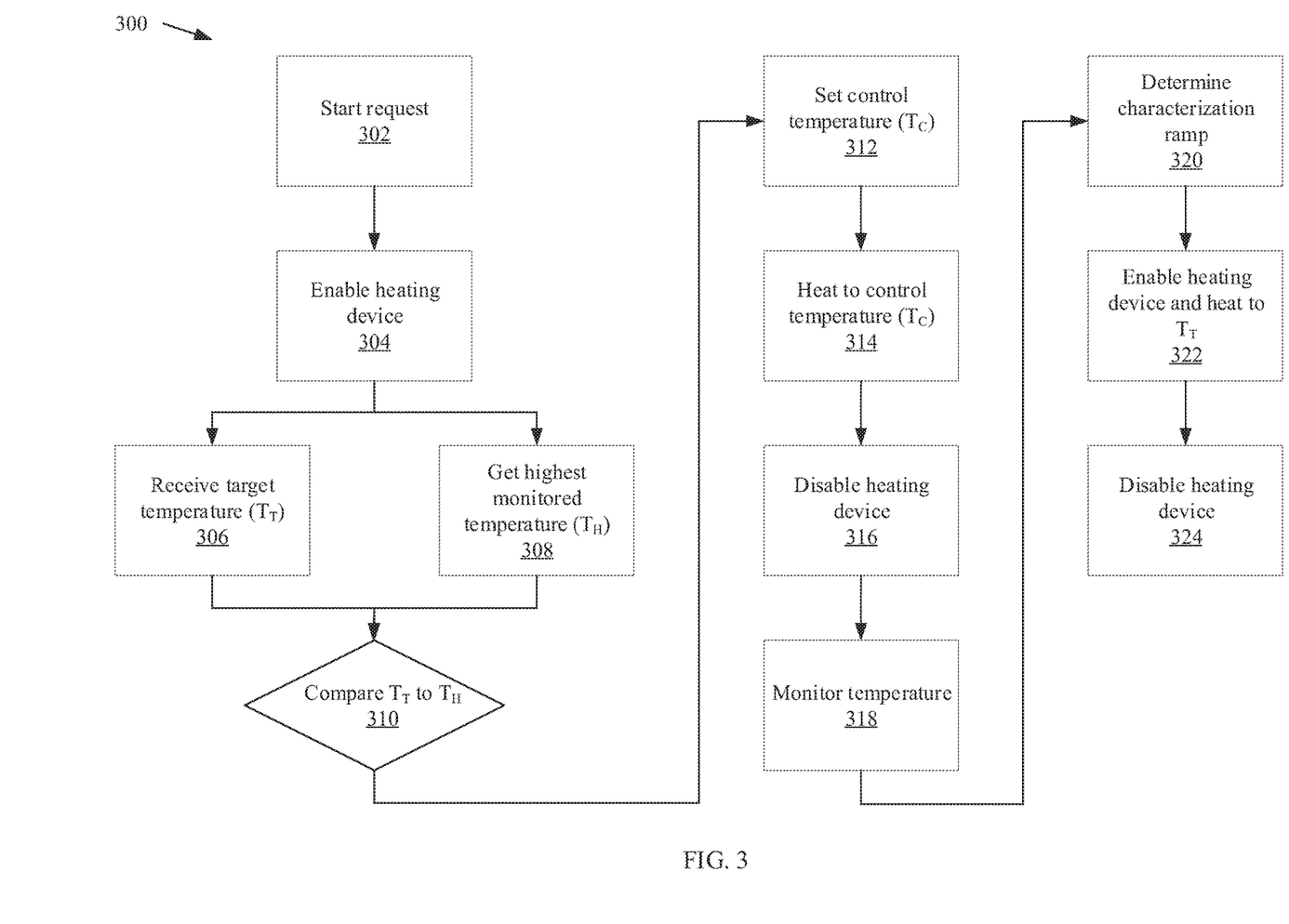
FIG. 3 shows a flow diagram representative of example machine readable instructions 300, which may be executed by the example control circuitry 105, 200 of FIGS. 1 and/or 2 to implement the example heating system of FIG. 1.

FIG. 3 shows a flow diagram representative of example machine readable instructions 300, which may be executed by the example control circuitry 105, 200 of FIGS. 1 and/or 2 to implement the example heating system 100 of FIG. 1. For example, the instructions 300, which may be in an application 224, may be executed by the processor 210 to control the heating device 110 to heat a workpiece 130 to a target temperature. An induction heating device is used as an example for the heating device 110, and it should be understood that various examples of the disclosure may use any type of heating device appropriate for a purpose such as, for example, welding.

In block 302, a start request for heating is received. In block 304, the heating device 110, for example, an induction heating device, is enabled. In block 306, a target temperature $T_T$ to which the workpiece 130 should be heated is received. The target temperature may be, for example, entered or selected by a user via the input devices 242 or received from another electronic device wirelessly and/or by wired communication via the communication interface 230. The workpiece 130 may also recognized by scanning an identification mark such as, for example, a bar code, with an input device 242, optically recognized by an application 224, etc., and then the target temperature looked up in, for example, a look-up table in the memory 220.

In block 308, the control circuitry 105 receives, wirelessly and/or via wire conductors, outputs from one or more sensors 120, each configured to monitor a temperatures at a location of the workpiece 130. The temperature monitoring may occur continuously or at some time interval. When the target temperature $T_T$ is received or determined, the control circuitry 105 will select the highest temperature $T_H$ for the workpiece 130 monitored via the sensors 120.

Figure 4:
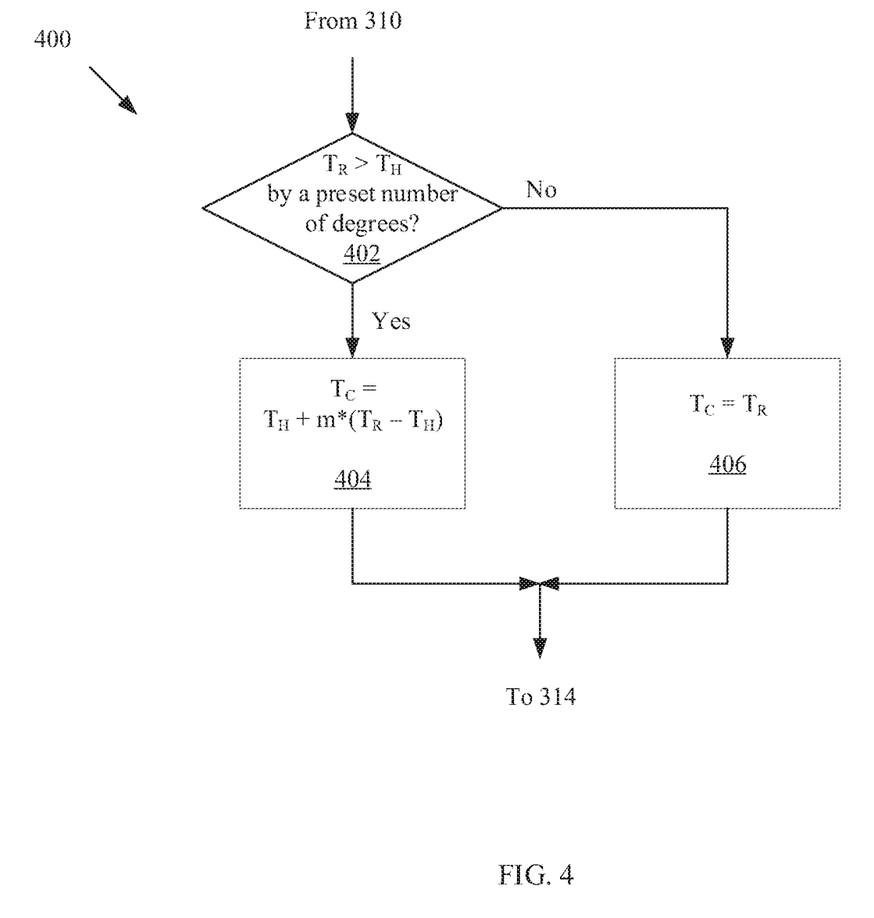
FIG. 4 shows a detailed flow diagram representative of example machine readable instructions 300, which may be executed by the example control circuitry 105, 200 of FIGS. 1 and/or 2 to implement the example heating system of FIG. 1.

In block 310, the target temperature $T_T$ is compared to the highest temperature $T_H$. Depending on the result of the comparison, the control temperature $T_C$ is set in block 312. FIG. 4 describes block 312 in more detail.

In block 314, the heating device 110 heats the workpiece 130 to the control temperature $T_C$, or to substantially the control temperature $T_C$ as allowed by the heating system 100. "Substantially the control temperature $T_C$" may be a temperature within a pre-determined margin to the temperature $T_C$ that may be pre-determined for a given usage. The pre-determined margin may depend on various parameters, such as, for example, the type of metal being heated, the type of heating device 110, etc. Accordingly, "substantially the control temperature $T_C$" may be set by the processor 210, by the user using any of the input devices 242, or via commands received with the communication interface 230.

As examples, the margin for an application may be within 10% of the control temperature $T_C$ in one case, 5% of the control temperature $T_C$ in another case, 1% of the control temperature $T_C$ in another case, etc. Therefore, as the margin may differ for different cases, the specific margins given as examples above do not limit any examples of the disclosure.

When the heating system 100 monitors the sensors 120 periodically, the temperature of the workpiece 130 may be at a temperature that is below or above the control temperature $T_C$. The monitoring period may adjustable in some examples of the disclosure, while other examples of the disclosure may have a fixed monitoring period. The monitoring period used may be variable in some examples of the disclosure while other examples of the disclosure may have a fixed monitoring period. That is, the monitoring period may change while monitoring the workpiece 130 or the monitoring period may remain the same for a first workpiece 130 but may be changed for a second workpiece 130. The monitoring period may be timed via a software timer in, for example, the operating system 222 or the applications 224, or a hardware timer that may be a part of, for example, the control circuitry 105.

Some examples involve determining that the control temperature $T_C$ is reached when the temperature is within a temperature range. The temperature range may be fixed or variable depending on various parameters such as, for example, the interval at which the temperature of the workpiece is determined, the characteristics of the workpiece, etc.

In block 316, the control circuitry 105 disables the heating device 110 to stop heating the workpiece 130 when the highest temperature $T_H$ from any of the various sensors 120 indicates that the workpiece 130 has reached the control temperature $T_C$ or is at substantially the control temperature $T_C$.

In block 318, the control circuitry 105 monitors the continuing rise in overshoot temperature of the workpiece 130 based on the outputs of the sensors 120. Once the outputs of the sensors 120 indicate that the temperature of the workpiece 130 has peaked, the temperature overshoot, which is the difference in temperature from the control temperature $T_C$ to the peak temperature, and the overshoot time, which is the time period from when the heating device 110 is disabled to the workpiece 130 reaching its peak temperature, are determined.

In block 320, a temperature ramp rate is determined by, for example, the processor 210 of the control circuitry 105 based on the temperature overshoot and/or the overshoot time for use in heating the workpiece 130 to the target temperature $T_T$. The temperature ramp rate may be a linear ramp or a non-linear ramp. An example of a linear ramp may be, for example, increasing the control temperature $T_C$ for the workpiece 130 by a constant temperature amount per unit time until the target temperature $T_T$ is reached without overshooting beyond an acceptable margin. The control temperature $T_C$ may be increased, for example, periodically.

In some other examples, the control circuitry 105 controls the temperature of the heating device 110 periodically such that the temperature of the workpiece reaches substantially the target temperature $T_T$ without overshooting beyond an acceptable margin. "Substantially the target temperature $T_T$" may be a temperature within a margin to the target temperature $T_T$ that may be pre-determined for a given usage. The margin may depend on various parameters, such as, for example, the type of metal being heated, the type of heating device 110, etc. Accordingly, "substantially the target temperature $T_T$" may be set by the processor 210, by the user using any of the input devices 242, or via commands received with the communication interface 230.

As examples, the margin for an application may be within 5% of the target temperature $T_T$ in one case, 2% of the target temperature $T_T$ in another case, 1% of the target temperature $T_T$ in another case, etc. Therefore, as the margin may differ for different cases, the specific margins given as examples above do not limit any examples of the disclosure.

The heating period used may be variable in some examples of the disclosure while other examples of the disclosure may have a fixed period. That is, the heating period may change while heating the workpiece 130 or the heating period may remain the same for a first workpiece 130 but may be changed for a second workpiece 130. The heating period may be timed via a software timer in, for example, the operating system 222 or the applications 224, or a hardware timer that may be a part of, for example, the control circuitry 105.

A single timer may be used for monitoring the temperature of the workpiece 130 and for using the temperature ramp rate in heating the workpiece 130, or independent timers may be used. The workpiece 130 may be heated to an interim temperature $T_I$ that is raised, for example, periodically based on the temperature ramp rate.

In block 322, the control circuitry 105 enables the heating device 110 to heat the workpiece 130 to the target temperature $T_T$ using the temperature ramp rate. An example of the disclosure may increase a target temperature of the workpiece 130 to an interim temperature $T_I$ periodically until the interim temperature $T_I$ equals the target temperature $T_T$. Accordingly, the heating device 110 can heat the workpiece 130 according to the increasing interim temperature $T_I$ until the target temperature $T_T$ is reached.

In block 324, when the workpiece 130 reaches the target temperature $T_T$, or reaches substantially the target temperature $T_T$, the heating device 110 is disabled.

While an example flow diagram is shown in FIG. 3 for illustrative purposes, it should be understood that various other flow diagrams may also describe other examples of the disclosure. For example, in another example of the disclosure, the blocks 306 and 308 may happen serially in either order rather than in parallel as shown in FIG. 3.

FIG. 4 shows a detailed flow diagram representative of example machine readable instructions 300, which may be executed by the example control circuitry 105, 200 of FIGS. 1 and/or 2 to implement the example heating system of FIG. 1. The example instructions 400 may be performed to implement block 312 of FIG. 3 to set the control temperature $T_C$.

In block 402, the comparison of the target temperature $T_T$ to the current highest temperature $T_H$ performed by the processor 210 is used. In block 404, in an example algorithm in the application 224 executed by the processor 210, when the difference between the target temperature $T_T$ and the current highest temperature $T_H$ is larger than a threshold value (TH1), the control temperature $T_C$ is set to:

$$T_C = T_H + m^*(T_R - T_H) \quad \text{(Equation 1)}$$

where 'm' is less than or equal to 1 and greater than or equal to 0.

Some examples of the disclosure may set 'm' to be in the range of, for example, substantially 0.15 to substantially 0.75. An example of the disclosure may set 'm' to, for example, substantially 0.25. Furthermore, some examples of the disclosure may set the threshold value (TH1) to be in the range of, for example, substantially 10° C. to substantially 50° C. An example of the disclosure may set the threshold value (TH1) to, for example, substantially 25° C.

In an example algorithm, when the difference between the target temperature $T_T$ and the current highest temperature $T_H$ is less than or equal to the threshold value (TH1), the control temperature $T_C$ is set by the processor 210 to the target temperature $T_T$:

$$T_C = T_T \quad \text{(Equation 2)}$$

Accordingly, in some examples, the heating system 100 is configured to control the heating device 110 based on the received target temperature ($T_T$), the temperature ramp rate, and feedback based on the outputs of the sensors 120.

While the disclosure has described various examples with respect to welding, it should be understood that the disclosure need not be so limited. Rather, the disclosure should be understood to apply to other situations where an item needs to be heated or pre-heated.

As can be seen, example heating systems 100 are disclosed for controlling heating of a workpiece 130, in which the system comprises an interface configured to receive a target temperature ($T_T$) for the workpiece, and a processor configured to determine, based on monitoring outputs of one or more temperature sensors, a current highest temperature ($T_H$) for the workpiece and set a control temperature ($T_C$) based on the received target temperature and the current highest temperature.

The heating system may also comprise a control system configured to heat the workpiece to substantially the control temperature ($T_C$) by turning on a heating device and turning off the heating device when the workpiece reaches substantially the control temperature ($T_C$).

The processor is configured to characterize a temperature ramp rate based on a measured temperature overshoot at the workpiece after turning off the heating device, and the control system is configured to heat the workpiece to the received target temperature ($T_T$) by controlling the heating device based on the temperature ramp rate.

The processor is configured to set the control temperature ($T_C$) to a temperature between the current highest temperature ($T_H$) and the received target temperature ($T_T$).

When the received target temperature ($T_T$) is greater than the current highest temperature ($T_H$) by an amount of at least a first number of degrees Centigrade, the processor is configured to set the control target temperature to:

$$T_C = T_H + m^*(T_R - T_H),$$

where 'm' is less than or equal to 1 and greater than or equal to 0.7. In some examples of the disclosure, 'm' may be a value in a range from substantially 0.15 to substantially 0.75. In an example of the disclosure, 'm' is substantially 0.25

When the received target temperature ($T_T$) is not greater than the current highest temperature by at least a first number of degrees Centigrade, the processor is configured to set the control temperature ($T_C$) to equal the received target temperature ($T_T$): $T_T = T_R$. In some examples of the disclosure, the first number of degrees Centigrade is in a range from substantially 10° Centigrade to substantially 50° Centigrade. In an example of the disclosure, the first number of degrees Centigrade is substantially 25° Centigrade.

In various examples of the disclosure, the heating system 100 is configured to heat the workpiece using induction. Various examples of the disclosure may comprise a communication device configured to receive the target temperature ($T_T$) via one or more of a user interface, wired communication from another device, and wireless communication from another device.

The processor is configured to perform one or both of monitoring the outputs of the one or more temperature sensors at an expiration of a first time timer, and control updating of the interim temperature ($T_I$) at an expiration of a second timer. In some examples of the disclosure, the first timer and the second timer may be the same timer, while in other examples of the disclosure, the first timer and the second timer may be separate, independent timers.

Accordingly, it can be seen that the heating system 100 is configured to control the heating device based on the received target temperature ($T_T$), the temperature ramp rate, and feedback based on the outputs of the one or more temperature sensors.

The present disclosure may also provide for methods for controlling heating of a workpiece, where a target temperature ($T_T$) is received for the workpiece. A method includes determining, from outputs of one or more temperature sensors, a current highest temperature ($T_H$) for the workpiece sensed by the one or more temperature sensors, and setting a control temperature ($T_C$) based on the received target temperature ($T_T$) and the current highest temperature ($T_H$).

The workpiece is then heated to substantially the control temperature ($T_C$) by turning on a heating device, and the heating device is turned off when the workpiece reaches substantially the control temperature ($T_C$). A temperature ramp rate is then characterized based on a measured temperature overshoot at the workpiece after turning off the heating device. The workpiece is heated to the received target temperature ($T_T$) by controlling the heating device based on the temperature ramp rate.

The control temperature ($T_C$) is set to a temperature between the current highest temperature ($T_H$) and the received target temperature ($T_T$), where when the received target temperature ($T_T$) is greater than the current highest temperature ($T_H$) by at least a first number of degrees Centigrade, the control temperature ($T_C$) is set to:

$$T_C = T_H + m^*(T_T - T_H),$$

where 'm' is less than or equal to 1 and greater than or equal to 0.

When the received target temperature ($T_T$) is not greater than the current highest temperature ($T_H$) by at least the first number of degrees Centigrade, the control temperature ($T_C$) is set to equal the received target temperature ($T_T$): $T_C = T_T$.

The first number of degrees Centigrade may be in a range from substantially 10° Centigrade to substantially 50° Centigrade, and 'm' may be in a range from substantially 0.15 to substantially 0.75. In an example of the disclosure, the first number of degrees Centigrade is 25° Centigrade and 'm' is equal to 0.25.

The heating device may heat the workpiece using induction.

The received target temperature ($T_T$) from a user may be received via one or more of a user interface, wired communication, or wireless communication.

The method further comprises monitoring the outputs of the one or more temperature sensors at an expiration of a first timer, and updating an interim temperature ($T_I$) at an expiration of a second timer, where the workpiece is heated to the interim temperature ($T_I$) based on the temperature ramp rate.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, "one of x or y" or "one of x and y" is equivalent to any element of the set {(x), (y)}.

As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain examples and/or aspects, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular examples disclosed. Instead, the present method and/or system will include all implementations falling within the scope of the appended claims, both literally and under the doctrine of equivalents.

What are claimed:

1. A system for controlling heating of a workpiece, comprising:
    an interface configured to receive a target temperature ($T_T$) for the workpiece, where a heating device is configured to heat the workpiece;
    a processor configured to:
    determine, based on monitoring outputs of one or more temperature sensors, a current highest temperature ($T_H$) for the workpiece; and
    set a control temperature ($T_C$) based on the received target temperature and the current highest temperature; and
    control circuitry configured to:
    heat the workpiece to the control temperature ($T_C$) by turning on the heating device and turning off the heating device when the workpiece reaches the control temperature ($T_C$);
    wherein:
        the processor is configured to characterize a temperature ramp rate based on a measured temperature overshoot at the workpiece after turning off the heating device; and
        the control circuitry is configured to heat the workpiece to the received target temperature ($T_T$) by controlling the heating device based on the temperature ramp rate.

2. The system of claim 1, wherein the processor is configured to set the control temperature ($T_C$) to a temperature between the current highest temperature ($T_H$) and the received target temperature ($T_T$).

3. The system of claim 1, wherein, when the received target temperature ($T_T$) is greater than the current highest temperature ($T_H$) by an amount of at least a first number of degrees Centigrade, the processor is configured to set the control temperature to:

$T_C = T_H + m*(T_R - T_H)$, where 'm' is less than or equal to 1 and greater than or equal to 0, and where $T_R$ is a threshold value.

4. The system of claim 3, wherein, when the received target temperature ($T_T$) is not greater than the current highest temperature by at least a first number of degrees Centigrade, the processor is configured to set the control temperature ($T_C$) to equal the received target temperature ($T_T$): $T_T = T_R$.

5. The system of claim 3, wherein the first number of degrees Centigrade is in a range from 10° Centigrade to 50° Centigrade.

6. The system of claim 3, wherein the first number of degrees Centigrade is 25° Centigrade.

7. The system of claim 3, wherein 'm' is a value in a range from 0.15 to 0.75.

8. The system of claim 3, wherein 'm' is a value of 0.25.

9. The system of claim 1, wherein the heating device is configured to heat the workpiece using induction.

10. The system of claim 1, comprising a communication device configured to receive the target temperature ($T_T$) via one or more of user interface, wired communication from another device, and wireless communication from another device.

11. The system of claim 1, wherein the processor is configured to perform one or both of:
monitor the outputs of the one or more temperature sensors at an expiration of a first time timer, and
control updating an interim temperature ($T_I$) based on the temperature ramp rate at an expiration of a second timer, wherein the control circuitry is configured to heat the workpiece to the interim temperature ($T_I$).

12. The system of claim 1, wherein the control circuitry is configured to control the heating device based on the received target temperature ($T_T$), the temperature ramp rate, and feedback based on the outputs of the one or more temperature sensors.

13. The system of claim 1, comprising a transceiver configured to wirelessly receive the target temperature ($T_T$) from another device.

14. The system of claim 1, wherein the processor is configured to determine a current temperature ($T_S$) for the workpiece based on monitoring the one or more temperature sensors.

15. The system of claim 14, wherein the processor is configured to output an alarm or alert in response to detecting at least a threshold reduction in the current temperature ($T_S$) while the heating device is heating the workpiece.

16. The system of claim 1, wherein the one or more temperature sensors comprise at least one of an armored temperature sensing device, a spot-welded temperature sensing device, a thermocouple, and an infrared temperature sensor.

17. A system for controlling heating of a workpiece, comprising:
an interface configured to receive a target temperature ($T_T$) for the workpiece wirelessly from another device, where an induction heater is configured to heat the workpiece;
a processor configured to:
determine, based on monitoring outputs of one or more temperature sensors, a current highest temperature ($T_H$) for the workpiece, wherein the one or more temperature sensors comprise at least one of an armored temperature sensing device, a spot-welded temperature sensing device, a thermocouple, and an infrared temperature sensor; and
set a control temperature ($T_C$) based on the received target temperature and the current highest temperature; and
control circuitry configured to:
heat the workpiece to the control temperature ($T_C$) by turning on the induction heater and turning off the induction heater when the workpiece reaches the control temperature ($T_C$);
wherein:
the processor is configured to characterize a temperature ramp rate based on a measured temperature overshoot at the workpiece after turning off the induction heater; and
the control circuitry is configured to heat the workpiece to the received target temperature ($T_T$) by controlling the induction heater based on the temperature ramp rate.

18. The system of claim 17, wherein the processor is configured to set the control temperature ($T_C$) to a temperature between the current highest temperature ($T_H$) and the received target temperature ($T_T$).

19. The system of claim 17, wherein the processor is configured to perform one or both of:
monitor the outputs of the one or more temperature sensors at an expiration of a first time timer, and
control updating an interim temperature ($T_I$) based on the temperature ramp rate at an expiration of a second timer, wherein the control circuitry is configured to heat the workpiece to the interim temperature ($T_I$).

20. The system of claim 17, wherein the control circuitry is configured to control the induction heater based on the received target temperature ($T_T$), the temperature ramp rate, and feedback based on the outputs of the one or more temperature sensors.

* * * * *